United States Patent
Kim et al.

(10) Patent No.: US 11,314,653 B2
(45) Date of Patent: Apr. 26, 2022

(54) MEMORY CONTROLLER

(71) Applicant: SK hynix Inc., Gyeonggi-do (KR)

(72) Inventors: Ju Hyun Kim, Gyeonggi-do (KR); Do Hun Kim, Gyeonggi-do (KR); Jin Yeong Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/149,278

(22) Filed: Jan. 14, 2021

(65) Prior Publication Data

US 2021/0349825 A1 Nov. 11, 2021

(30) Foreign Application Priority Data

May 11, 2020 (KR) .................. 10-2020-0055787

(51) Int. Cl.
  *G06F 12/0882* (2016.01)
  *G06F 12/0891* (2016.01)
  *G06F 11/10* (2006.01)
  *G06F 12/02* (2006.01)

(52) U.S. Cl.
  CPC ...... *G06F 12/0882* (2013.01); *G06F 11/1068* (2013.01); *G06F 12/0238* (2013.01); *G06F 12/0891* (2013.01); *G06F 2212/7201* (2013.01); *G06F 2212/7209* (2013.01)

(58) Field of Classification Search
  CPC ............. G06F 12/0882; G06F 12/0238; G06F 12/0891; G06F 2212/7201; G06F 2212/7209; G06F 11/1068
  See application file for complete search history.

(56) References Cited

U.S. PATENT DOCUMENTS

| | | | |
|---|---|---|---|
| 10,157,004 B2 | 12/2018 | Michaeli | |
| 2013/0091322 A1* | 4/2013 | Wang | G06F 12/0246 711/103 |
| 2013/0151892 A1* | 6/2013 | Huang | G06F 12/0246 714/14 |
| 2017/0300246 A1* | 10/2017 | Michaeli | G06F 3/065 |
| 2018/0275887 A1* | 9/2018 | Yang | G06F 3/0652 |
| 2018/0307558 A1* | 10/2018 | Chen | G06F 11/14 |

* cited by examiner

*Primary Examiner* — Michael Krofcheck (74) *Attorney, Agent, or Firm* — IP & T Group LLP (57) ABSTRACT

A controller that controls a memory device including a plurality of pages each corresponding to a physical address, the controller may include: a memory suitable for storing a plurality of logical-to-physical (L2P) chunks each indicating mapping between one or more logical addresses and one or more physical addresses and an original valid page bitmap (VPB) indicating whether each of the plurality of pages is a valid page that stores valid data; and a processor suitable for generating a reconstructed VPB based on normal L2P chunks when an corrupted L2P chunk is detected, detecting pages having different states in the original VPB and the reconstructed VPB, obtaining logical addresses mapped to physical addresses of the detected pages, respectively, and recovering the corrupted L2P chunk based on the physical addresses of the detected pages and the obtained logical addresses.

15 Claims, 7 Drawing Sheets

|  | MAIN AREA | SPARE AREA |
|---|---|---|
| PA1 | DATA_LA4 | LA4 |
| PA2 | ... | ... |
| PA3 | DATA_LA2 | LA2 |
| PA4 | ... | ... |
| PA5 | DATA_LA3 | LA3 |
| PA6 | ... | ... |
| PA7 | ... | ... |
| PA8 | ... | ... |
| PA9 | ... | ... |
| PA10 | DATA_LA1 | LA1 |
| ... | ... | ... |

MEMORY DEVICE(150)

FIG. 3A

| LA | PA |
|---|---|
| LA1 | PA10 |
| LA2 | PA3 |
| LA3 | PA5 |
| LA4 | PA1 |
| LA5 | PA12 |
| LA6 | PA13 |
| LA7 | PA20 |
| LA8 | PA21 |
| ... | ... |

L2P TABLE(202)

FIG. 3B

| | VALIDITY BIT |
|---|---|
| PA1 | 1 |
| PA2 | 0 |
| PA3 | 1 |
| PA4 | 0 |
| PA5 | 1 |
| PA6 | 0 |
| PA7 | 0 |
| PA8 | 0 |
| PA9 | 0 |
| PA10 | 1 |
| ... | ... |

VPB(204)

MEMORY CONTROLLER

CROSS-REFERENCE TO RELATED APPLICATION(S)

The present application claims priority under 35 U.S.C. § 119(a) to Korean Patent Application No. 10-2020-0055787, filed on May 11, 2020, the disclosure of which is incorporated herein by reference in its entirety.

BACKGROUND

1. Field

Various embodiments of the present disclosure generally relate to a controller for controlling a non-volatile memory device.

2. Description of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since they have no moving parts, memory systems provide advantages such as excellent stability and durability, high information access speed, and low power consumption. Examples of memory systems having such advantages include universal serial bus (USB) memory devices, memory cards having various interfaces, and solid state drives (SSD).

SUMMARY

Various embodiments of the present disclosure are directed to a memory system that may rapidly recover errors of map data stored in a volatile memory, and an operating method of the memory system.

In accordance with an embodiment, a controller that controls a memory device including a plurality of pages each corresponding to a physical address, the controller includes: a memory suitable for storing a plurality of logical-to-physical (L2P) chunks each indicating mapping between one or more logical addresses and one or more physical addresses and an original valid page bitmap (VPB) indicating whether each of the plurality of pages is a valid page that stores valid data; and a processor suitable for generating a reconstructed VPB based on normal L2P chunks when a corrupted L2P chunk is detected, detecting pages having different states in the original VPB and the reconstructed VPB, obtaining logical addresses mapped to physical addresses of the detected pages, respectively, and recovering the corrupted L2P chunk based on the physical addresses of the detected pages and the obtained logical addresses.

In accordance with an embodiment, a controller that controls a memory device including a plurality of pages each corresponding to a physical address, the controller includes: a memory suitable for storing a plurality of logical-to-physical (L2P) chunks each indicating mapping between one or more logical addresses and one or more physical addresses and an original valid page bitmap (VPB) indicating whether each of the plurality of pages is a valid page that stores valid data; and a processor suitable for generating an original valid page count (VPC) for each page group based on the original VPB when a corrupted L2P chunk is detected, generating a reconstructed VPC for each page group based on normal L2P chunks, determining logical addresses included in the corrupted L2P chunk based on the location where the L2P chunk is stored, detecting pages groups having different states in the original VPC and the reconstructed VPC, searching for physical addresses, mapped to logical addresses included in the corrupted L2P chunk, by referring to spare areas of the detected page groups, and recovering the error L2P chunk based on the logical addresses included in the error L2P chunk and the searched physical addresses.

In accordance with an embodiment, an operating method of a controller, the operating method includes: updating plural logical-to-physical (L2P) chunks each indicating mapping between logical and physical addresses and a valid page bitmap (VPB) representing validity of respective pages within a memory device while controlling the memory device to perform an operation; reconstructing, upon detecting a corrupted L2P chunk, the VPB such that the reconstructed VPB represents first pages as valid and second pages as invalid among pages in the original VPB, the first pages being indicated by physical addresses within normal L2P chunks and the second pages being pages other than the first pages; and recovering the corrupted L2P chunk with physical addresses indicating inconsistent pages, which are represented as valid in the original VPB among the second pages, and logical addresses read from the inconsistent pages.

DETAILED DESCRIPTION

Hereinafter, various embodiments of the present disclosure are described below in detail with reference to the accompanying drawings. In the following description, various details are provided in the context of the present invention; well-known technical matter is omitted so as not to obscure the subject matter of the present embodiments. Throughout the specification, reference to "an embodiment," "another embodiment" or the like is not necessarily to only one embodiment, and different references to any such phrase are not necessarily to the same embodiment(s). The term "embodiment" when used herein does not necessarily refer to all embodiments.

Figure 1:
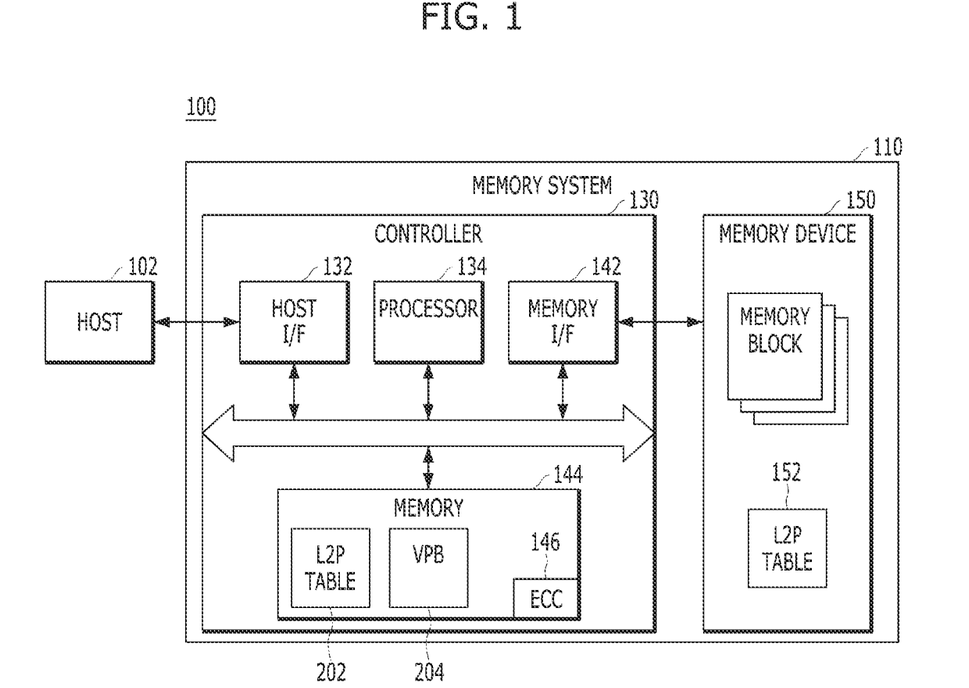
FIG. 1 is a block diagram illustrating a data processing system in accordance with an embodiment.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include any of various portable electronic devices such as a mobile phone, MP3 player and laptop computer, or any of various non-portable electronic devices such as a desktop computer, a game machine, a television (TV), and a projector.

The host 102 may include at least one operating system (OS), which may manage and control overall functions and operations of the host 102, and provide operation between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user.

The memory system 110 may operate to store data for the host 102 in response to a request of the host 102. Non-limiting examples of the memory system 110 include a solid state drive (SSD), a multi-media card (MMC), a secure digital (SD) card, a universal serial bus (USB) device, a universal flash storage (UFS) device, compact flash (CF) card, a smart media card (SMC), a personal computer memory card international association (PCMCIA) card and/or memory stick. The MMC may include an embedded MMC (eMMC), reduced size MMC (RS-MMC) and/or micro-MMC. The SD card may include a mini-SD card and/or micro-SD card.

The memory system 110 may be embodied by any of various types of storage devices. Examples of such storage devices include, but are not limited to, volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory. The flash memory may have a 3-dimensional (3D) stack structure.

The memory system 110 may include a controller 130 and a memory device 150. The memory device 150 may store data for the host 102, and the controller 130 may control data storage into the memory device 150.

The controller 130 and the memory device 150 may be integrated into a single semiconductor device. For example, the controller 130 and the memory device 150 may be integrated as one semiconductor device to constitute a solid state drive (SSD). When the memory system 110 is used as an SSD, the operating speed of the host 102 connected to the memory system 110 can be improved. In addition, the controller 130 and the memory device 150 may be integrated as one semiconductor device to constitute a memory card, such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, or universal flash storage (UFS) device.

Non-limiting application examples of the memory system 110 include a computer, an Ultra Mobile PC (UMPC), a workstation, a netbook, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a program operation, and provide data stored therein to the host 102 through a read operation. The memory device 150 may include a plurality of memory blocks, each of which may include a plurality of pages, and each of the pages may include a plurality of memory cells coupled to a word line. In an embodiment, the memory device 150 may be a flash memory. The flash memory may have a 3-dimensional (3D) stack structure.

The controller 130 may control the memory device 150 in response to a request from the host 102. For example, the controller 130 may provide data read from the memory device 150 to the host 102, and store data provided from the host 102 into the memory device 150. To this end, the controller 130 may control read, program and erase operations of the memory device 150.

The controller 130 may convert a logical address, which is used in a file system of the host 102, into a physical address of the memory device 150, and allow the host 102 to access the memory device 150.

Figure 2:
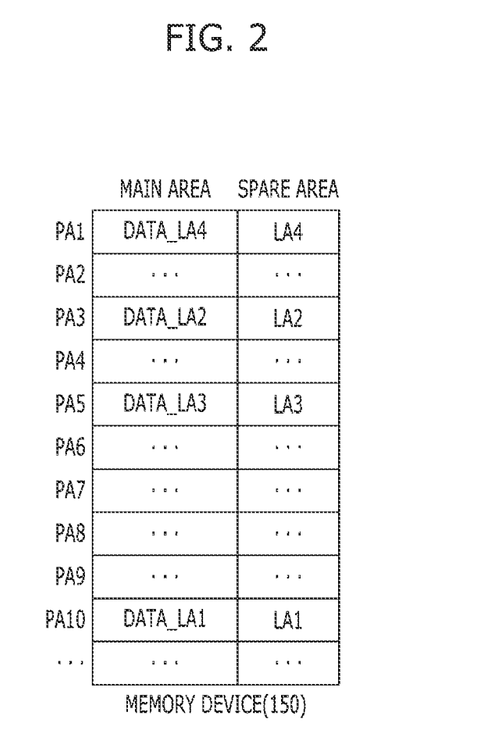
FIG. 2 is a diagram illustrating a relationship between a logical address and a physical address.

FIG. 2 is a diagram illustrating a relationship between a logical address and a physical address.

FIG. 2 illustrates storage space of the memory device 150 on a basis of the physical address. The memory device 150 may perform a write or read operation in units of pages. Each page of the memory device 150 may be distinguished by the physical address.

Each page of the memory device 150 may include a main area and a spare area. The main area may store user data received from the host 102. The spare area may store meta data for the user data.

For example, the controller 130 may control the memory device 150 to write data to a $10^{th}$ physical address PA10 based on a write command for a first logical address LA1 received from the host 102. The memory device 150 may write user data corresponding to the first logical address LA1 to the main area of a page that the $10^{th}$ physical address PA10 indicates, and write a logical address of the user data, that is, the first logical address LA1 to the spare area of the page.

The memory device 150 may not perform an overwrite operation and performs a program operation and an erase operation in different units of data. When the host 102 wants to update the user data corresponding to the first logical address LA1, the controller 130 may store the user data to be updated in the main area of a blank page, write the first logical address LA1 to the spare area of the blank page, and treat data of the $10^{th}$ physical address PA10 as invalid data.

As shown in FIG. 1, the controller 130 may include a host interface (I/F) 132, a processor 134, a memory I/F 142 such as a NAND flash controller (NFC), and a memory 144, all operatively coupled via an internal bus.

The host I/F 132 may be configured to process a command and data of the host 102, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE).

The host I/F 132 may be driven through firmware referred to as a host interface layer (HIL) in order to exchange data with the host.

The memory I/F 142 may serve as a memory/storage interface for interfacing the controller 130 and the memory device 150 such that the controller 130 controls the memory device 150 in response to a request from the host 102. When the memory device 150 is a flash memory, even more specifically a NAND flash memory, the memory I/F 142 may generate a control signal for the memory device 150 and process data to be provided to the memory device 150 under the control of the processor 134. The memory I/F 142 may work as an interface (e.g., a NAND flash interface) for processing a command and data between the controller 130 and the memory device 150. Specifically, the memory I/F 142 may support data transfer between the controller 130 and the memory device 150.

The memory I/F 142 may be driven through firmware referred to as a flash interface layer (FIL) in order to exchange data with the memory device 150.

The memory 144 may serve as a working memory of the memory system 110 and the controller 130, and store data for driving the memory system 110 and the controller 130. The controller 130 may control the memory device 150 to perform read, program and erase operations in response to a request from the host 102. The controller 130 may provide data read from the memory device 150 to the host 102, may store data provided from the host 102 into the memory device 150. The memory 144 may store data for the controller 130 and the memory device 150 to perform these operations. For example, the memory 144 may store an L2P table 202 indicating logical-to-physical (L2P) address mapping. In addition, the memory 144 may store a valid page bitmap (VPB) 204 indicating whether each of the pages of the memory device 150 is a valid page that stores valid data.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 exemplifies the memory 144 disposed within the controller 130. In another embodiment, the memory 144 may be embodied by an external volatile memory having a memory interface transferring data between the memory 144 and the controller 130.

The memory 144 may include an error correction code (ECC) component 146. The ECC component 146 may detect and correct errors included in data read from the memory 144. The memory 144 may perform an error correction encoding operation on a data chunk having a fixed size, generate data to which parity bits have been added, and store the data therein. The memory 144 may detect and correct the errors by performing an error correction decoding operation on the data, to which the parity bits have been added, when reading the data stored therein. For example, the ECC component 146 may perform the error correction encoding and decoding operations by using Hamming codes. The ECC component 146 is not limited to a specific structure. The ECC component 146 may include any circuit, module, system or device for error correction.

Figure 3A:
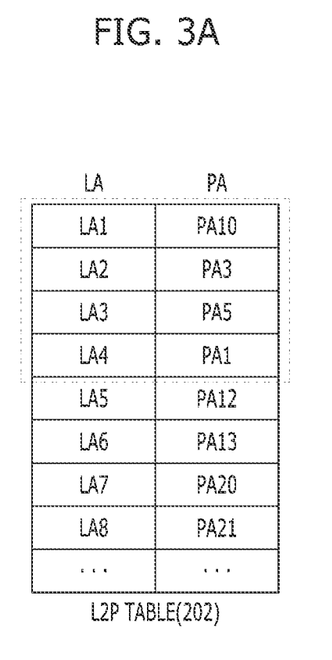
FIG. 3A is a diagram illustrating a logical-to-physical (L2P) table.

FIG. 3A is a diagram lustrating the L2P table 202.

The L2P table 202 may include L2P entries indicating physical addresses mapped to logical addresses, respectively. The L2P entries may be aligned or ordered on a basis of the logical addresses so that the controller 130 can easily find the physical addresses by using the logical addresses of the host 102. The L2P table 202 may be error-correction-encoded and decoded in units of data chunks. That is, the L2P table 202 may include a plurality of L2P chunks. Each of the L2P chunks may include one or more L2P entries. A dotted line illustrated in FIG. 3A represents one L2P chunk. In this disclosure, an L2P chunk may be within the L2P table 202 loaded from the L2P table 152 stored in the memory device 150.

Figure 3B:
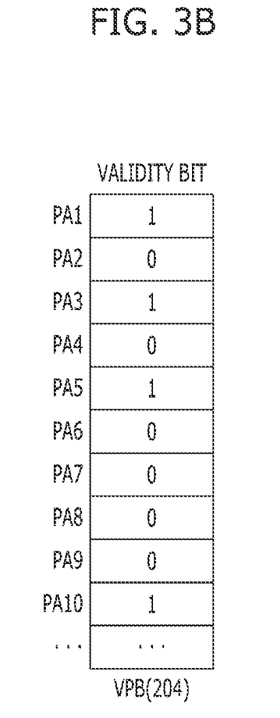
FIG. 3B is a diagram illustrating a valid page bitmap (VPB).

FIG. 3B is a diagram illustrating the VPB 204.

The VPB 204 may indicate whether each page of the memory device 150 is a valid page for storing valid data. For example, one bit of the VPB 204 may indicate whether a page that a specific physical address indicates is a valid page. Each bit may be aligned in a physical address order of each page. In the example of FIG. 3B, a page having a validity bit of "1" may indicate that such page is a valid page. In addition, a page having a validity bit of "0", which indicates that such page is an invalid page, may be in an erase state or store invalid data.

When a specific memory block of the memory device 150 becomes an unusable bad block, the controller 130 may replace the bad block with a spare block. Depending on implementation, the controller 130 may use a virtualized physical address to maintain a consistent address in some cases even though an actual physical address is changed due to the block replacement of the memory device 150. Depending on implementation, the physical addresses included in the L2P table 202 and the physical addresses of the pages of the VPB 204 may be the actual physical addresses of the memory device 150 or the virtualized physical addresses.

Referring back to FIG. 1, the processor 134 may control overall operation of the memory system 110. The processor 134 may drive firmware to control overall operation of the memory system 110. The firmware may be referred to as flash translation layer (FTL). Also, the processor 134 may be realized as a microprocessor or a central processing unit (CPU).

The processor 134 may drive the FTL and perform a foreground operation corresponding to a request received from the host. For example, the processor 134 may control a write operation of the memory device 150 in response to a write request from the host and control a read operation of the memory device 150 in response to a read request from the host.

The processor 134 may manage the L2P table 202 and the VPB 204 to control access to memory device 150 in response to a read or write command received from host 102 and logical addresses.

For example, the processor 134 may load all or a portion of L2P table 152 from the memory device 150 into the memory 144 when the memory system 110 is booted up. The portion of the L2P table 152 loaded into the memory 144 may be the L2P table 202. When an L2P entry changes, the processor 134 may update the L2P table 202 by reflecting the change of the L2P entry. The processor 134 may store the updated L2P table 202 to update the L2P table 152 in the memory device 150 when the memory system 110 normally terminates. The processor 134 may also load the VPB 204 from the memory device 150 to the memory 144 when the memory system 110 is booted up, and update and store the VPB 204 back in the memory device 150 in a similar manner to the L2P entry when the memory system 110 normally terminates.

Also, the controller 130 may perform a background operation on the memory device 150 through the processor 134, which is realized as a microprocessor or a CPU. For example, the background operation performed onto the memory device 150 may include a garbage collection (GC) operation, a wear-leveling (WL) operation, a map flush operation, or a bad block management operation. The L2P table 202 and the VPB 204 may be updated through a background operation of the controller 130.

The ECC component 146 has a limited error correction capability, which may be defined in terms of number of correctable errors. For example, the ECC component 146 may correct errors of a certain number of bits within its capability using data chunks and parity bits, although more errors may have been detected.

Error correction encoding and decoding operations may be performed on the VPB 204 in units of VPB chunks, and one or more errors may occur that cannot be corrected by the ECC component 146 in the VPB chunk, because such error(s) exceed the error correction capability of the ECC component 146. The processor 134 may refer to spare areas of pages indicated by a corrupted VPB chunk in which an uncorrectable error occurs. When the spare areas of pages indicated by a corrupted VPB chunk are programmed with logical addresses, that is, when logical addresses are mapped to physical addresses of the pages indicated by the corrupted VPB chunk, the processor 134 may determine whether mapping relationships between physical addresses and logical addresses in the spare areas coincides with mapping relationships between logical addresses and physical addresses in the L2P table 202.

Among the pages indicated by the corrupted VPB chunk, the processor 134 may represent a page as valid when the mapping relationship between a physical address and a logical address in the spare area coincides with the mapping relationship between a logical address and a physical address in the L2P table 202 with respect to the page. Among the pages indicated by the corrupted VPB chunk, the processor 134 may represent a page as invalid when the mapping relationship between a physical address and a logical address in the spare area does not coincide with the mapping relationship between a logical address and a physical address in the L2P table 202 with respect to the page. By representing the pages as valid or invalid within the corrupted VPB chunk, the corrupted VPB chunk may be recovered.

When the processor 134 reads an L2P chunk to convert a logical address into a physical address, the uncorrectable error may occur. As described with reference to FIG. 2, the spare area of each page of the memory device 150 may store a logical address mapped to a physical address of a corresponding page. However, when the processor 134 does not know physical addresses to which logical addresses included in the L2P chunk are mapped, the processor 134 needs to search the logical addresses of all the spare areas. When the processor 134 needs to search the logical addresses of all the spare areas and recover the L2P chunk whenever the uncorrectable error occurs in the L2P chunk, performance of foreground and background operations performed with reference to the L2P chunk may decrease.

Further, differently from the L2P table 202 loaded into the memory 144, the L2P table 152 stored in the memory device 150 does not necessarily include the latest L2P mapping information. For example, the L2P table 152 stored in the memory device 150 may include L2P mapping information at the time of booting of the memory system 110, and not include L2P mapping information updated after the booting of the memory system 110. Therefore, it is difficult to recover the L2P chunk, in which the error occurs, by using the L2P table 152 stored in the memory device 150.

Due to high integration of the memory 144, a risk that the uncorrectable error will occur in the L2P chunk increases. Accordingly, there is a need for a method by which the processor 134 may rapidly and accurately recover the L2P chunk even though the uncorrectable error occurs in the L2P chunk.

According to an embodiment, when an uncorrectable error occurs in the L2P chunk, the processor 134 may recover the L2P chunk even though only a few spare areas of the memory device 150 are read. Hereinafter, an L2P chunk in which an uncorrectable error occurs is referred to as a corrupted L2P chunk, and an L2P chunk containing no error or only correctable error(s) is referred to as a normal L2P chunk.

According to an embodiment, the processor 134 may reconstruct the VPB based on the normal L2P chunk within the L2P table 202 when the corrupted L2P chunk is found. Hereinafter, the VPB originally stored in the memory 144 is referred to as an original VPB and a VPB reconstructed from the original VPB based on the normal L2P chunk within the L2P table 202 is referred to as a reconstructed VPB.

In a reconstructed VPB, among the pages included in the memory device 150, all the pages indicated by physical addresses included in the normal L2P chunks may be represented as valid pages, and remaining pages indicated by physical addresses in the corrupted L2P chunks may be represented as invalid pages. In the original VPB, actual valid pages and actual invalid pages may be represented as valid pages and invalid pages, respectively. The actual valid pages may be represented by physical addresses included in the corrupted L2P chunk as well as the physical addresses included in the normal L2P chunk. This is because the pages indicated by the physical addresses included in the corrupted L2P chunk store valid data since the logical addresses and physical addresses included in the corrupted L2P chunk are mapped to each other.

The processor 134 may know the physical addresses, included in the corrupted L2P chunk, by comparing the original VPB with the reconstructed VPB. For example, the processor 134 may determine physical addresses of pages, which are represented as valid pages in the original VPB but represented as invalid pages in the reconstructed VPB, as the physical addresses included in the corrupted L2P chunk.

When the processor 134 accesses the spare area of the page indicated by the physical addresses, the processor 134 may know the logical addresses mapped to the physical addresses, respectively. The processor 134 may recover the corrupted L2P chunk into the normal L2P chunk based on the physical and logical addresses.

According to an embodiment, even though the corrupted L2P chunk including an uncorrectable error is found, the processor 134 may rapidly and accurately recover the corrupted L2P chunk. Thus, access performance and accuracy of the memory system 110 may be improved.

Operations of the memory system 110 according to an embodiment are described in detail with reference to FIGS. 4 to 6.

Figure 4:
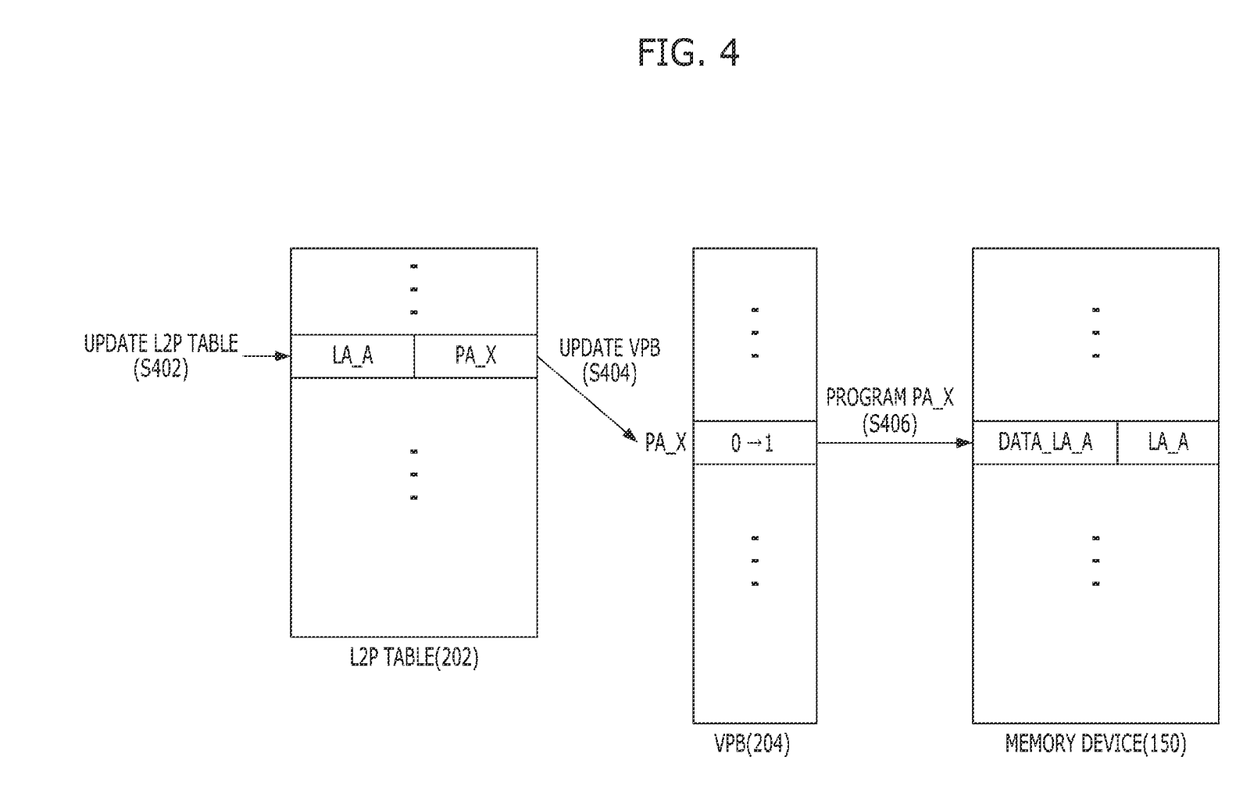
FIG. 4 is a diagram illustrating a write operation of a memory system.

FIG. 4 is a diagram illustrating a write operation of the memory system 110.

FIG. 4 illustrates the L2P table 202, the VPB 204 and the memory device 150.

A write operation of the memory system 110 may be performed based on a write command of the host 102 or be performed as a background operation of the processor 134.

In operation S402, the processor 134 may map a physical address to a logical address to perform the write operation, and update an L2P entry of the corresponding logical address. FIG. 4 illustrates a state in which a logical address A (LA_A) is mapped to a physical address X (PA_X).

In operation S404, the processor 134 may update the VPB 204 to represent a page, indicated by the physical address X (PA_X), as a valid page. When there is an existing physical address mapped to the logical address A (LA_A), the processor 134 may represent the page, indicated by the physical address, as an invalid page.

In operation S406, the processor 134 may program data DATA_LA_A, corresponding to the logical address A (LA_A), into a main area of the page indicated by the physical address X (PA_X), and control the memory device 150 to program the logical address A (LA_A) into a spare area.

Figure 5:
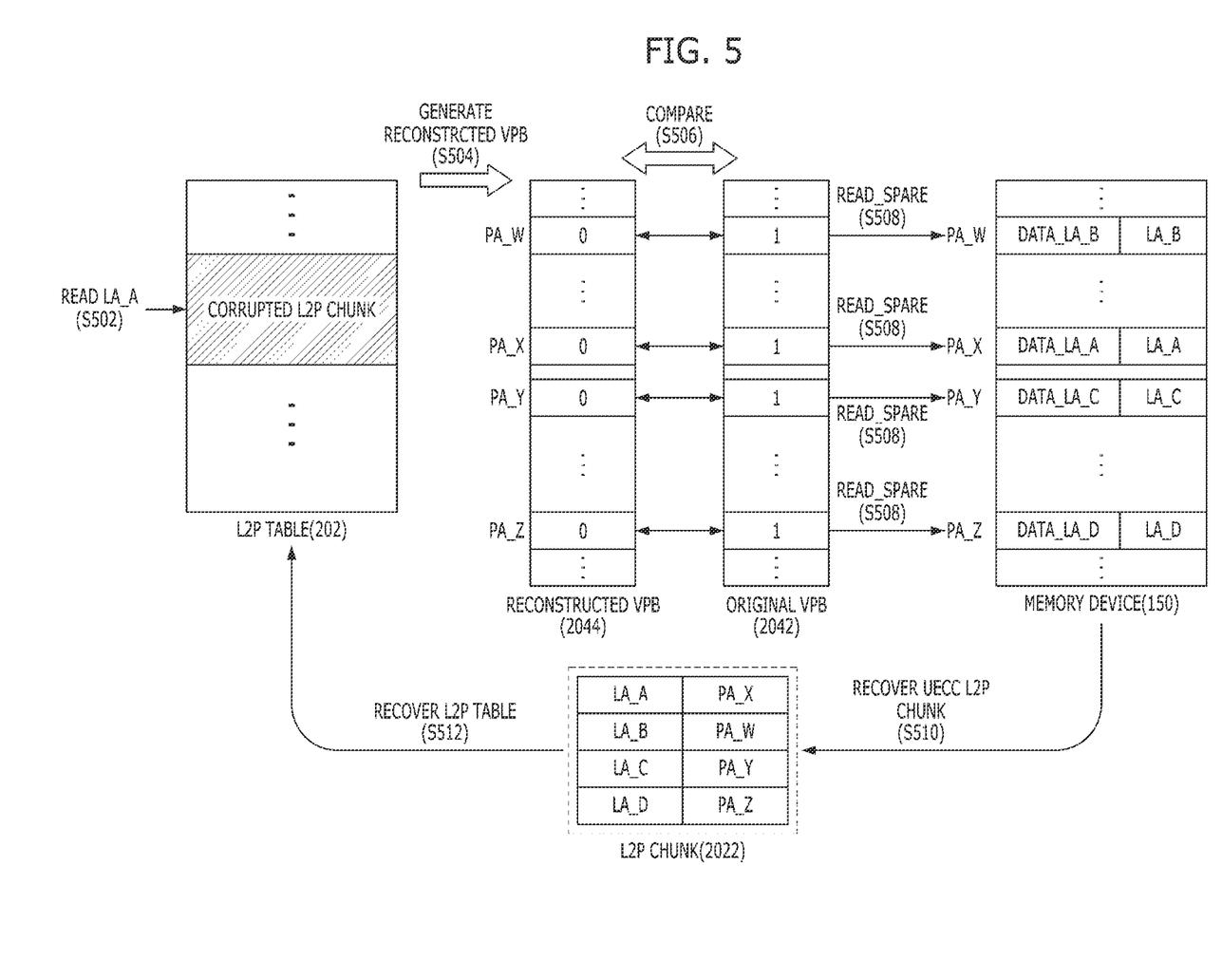
FIG. 5 is a diagram illustrating an L2P chunk recovery operation of a memory system in accordance with a first embodiment.

FIG. 5 is a diagram illustrating an L2P chunk recovery operation of the memory system 110 in accordance with a first embodiment.

FIG. 5 illustrates an L2P table 202, an original VPB 2042, a reconstructed VPB 2044, an L2P chunk 2022 and a memory device 150.

In operation S502, the processor 134 may read a L2P chunk including a logical address A (LA_A) from the memory 144. For example, the processor 134 may find the location where the L2P chunk based on the logical address A (LA_A). The L2P chunk may mapping relationship between logical addresses and physical addresses. For example, the L2P chunk may include the logical address A (LA_A), a logical address B (LA_B), a logical address C (LA_C) and a logical address D (LA_D), which are consecutive logical addresses. The ECC component 146 included in the memory 144 may perform an error correction decoding operation on the L2P chunk to be read.

The operation in which the processor 134 reads the L2P chunk may be performed based on a read command for the logical address A (LA_A) of the host 102 or performed by a background operation of the processor 134.

When the L2P chunk is a corrupted L2P chunk, the processor 134 may not find a physical address mapped to the logical address A (LA_A), and not obtain data corresponding to the logical address A (LA_A) from the memory device 150. The processor 134 may recover the corrupted L2P chunk by performing operations S504, S506, S508, S510 and S512.

In operation S504, the processor 134 may generate the reconstructed VPB 2044 based on normal L2P chunks of the L2P table 202. The processor 134 may represent pages, indicated by physical addresses included in the normal L2P chunks, as valid pages in the reconstructed VPB 2044. In addition, the processor 134 may represent pages, indicated by physical addresses not included in the normal L2P chunks, as invalid pages in the reconstructed VPB 2044. The physical addresses not in the normal L2P chunks may include physical addresses in the corrupted L2P chunks. Accordingly, in the reconstructed VPB 2044, pages indicated by physical addresses included in the corrupted L2P chunks as well as pages in an erase state and pages storing invalid data may also be represented as the invalid pages. In an example of FIG. 5, bits for each page of the reconstructed VPB 2044 are mostly omitted, and a bit of each of pages indicated by a physical address W (PA_W), a physical address X (PA_X), a physical address Y (PA_Y) and a physical address Z (PA_Z) is represented as "0". That is, the physical addresses W (PA_W), X (PA_X), Y (PA_Y) and Z (PA_Z) are exemplified as physical addresses not included in the normal L2P chunks while reconstructing the VPB. Thus, the pages represented by these physical addresses are exemplified as invalid in the reconstructed VPB 2044.

In operation S506, the processor 134 may compare the original VPB 2042 with the reconstructed VPB 2044, and detect the physical addresses included in the corrupted L2P chunk. The processor 134 may use the VPB 204, previously stored in the memory 144, as the original VPB 2042.

Pages represented as valid pages in the original VPB 2042 correspond to actual valid pages. All the pages indicated by the physical addresses included in the normal L2P chunks and the physical addresses included in the corrupted L2P chunk may be the actual valid pages. In the example of FIG. 5, bits for each page of the original VPB 2042 are mostly omitted, and a bit of each of pages indicated by the physical address W (PA_W), the physical address X (PA_X), the physical address Y (PA_Y) and the physical address Z (PA_Z) is represented as "1". That is, the pages represented by the physical addresses W (PA_W), X (PA_X), Y (PA_Y) and Z (PA_Z) are exemplified as actual valid pages according to the original VPB 2042.

The processor 134 may determine, as the physical addresses included in the corrupted L2P chunk, the physical addresses, which indicate the pages represented as valid in the original VPB 2042 but represented as invalid in the reconstructed VPB 2044. As to the pages in the erase state and the pages storing invalid data, corresponding physical addresses may indicate those pages as invalid in both the original VPB 2042 and the reconstructed VPB 2044. In the example of FIG. 5, the processor 134 may determine the physical address W (PA_W), the physical address X (PA_X), the physical address Y (PA_Y) and the physical address Z (PA_Z) as the physical addresses included in the corrupted L2P chunk due to the discrepancy in the representation of the validity of the corresponding pages between the original VPB 2042 and the reconstructed VPB 2044.

In operation S508, the processor 134 may control the memory device 150 to perform a read operation on a spare area of the page indicated by the physical address detected in S506. The processor 134 may obtain logical addresses respectively mapped to physical addresses detected as a result of operation S506. The obtained logical addresses may be regarded as logical addresses that are supposed to be included in the corrupted L2P chunk. In the example of FIG. 5, the memory device 150 may read logical addresses from the spare areas of the pages indicated by the physical address W (PA_W), the physical address X (PA_X), the physical address Y (PA_Y) and the physical address Z (PA_Z), which are detected as a result of operation S506. The memory device 150 may output logical address B (LA_B), logical address A (LA_A), logical address C (LA_C) and logical address D (LA_D) from the spare areas of the pages indicated by the physical address W (PA_W), the physical address X (PA_X), the physical address Y (PA_Y) and the physical address Z (PA_Z), respectively.

In operation S510, the processor 134 may recover the corrupted L2P chunk based on the logical addresses and physical addresses obtained in operations S506 and S508. FIG. 5 illustrates the recovered L2P chunk 2022. When the L2P chunk 2022 is recovered, the processor 134 may recognize that the physical address mapped to the logical address A (LA_A) is the physical address X (PA_X). If necessary, the processor 134 may control the memory device 150 to perform the read operation on the page indicated by the physical address X (PA_X).

In operation S512, the processor 134 may recover the L2P table 202 by reflecting the recovered L2P chunk 2022 in the L2P table 202.

Figure 6:
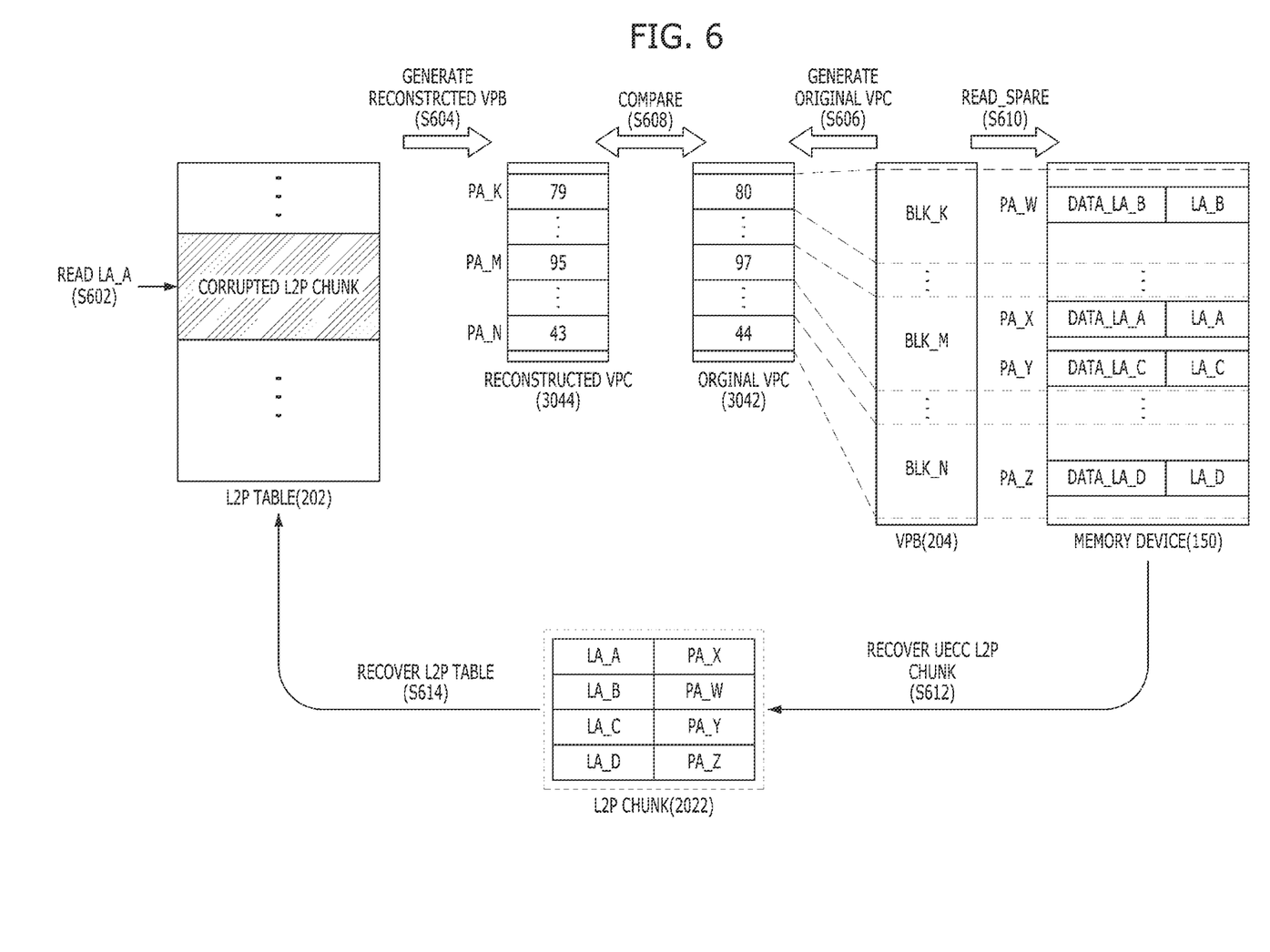
FIG. 6 is a diagram illustrating an L2P chunk recovery operation of a memory system in accordance with a second embodiment.

FIG. 6 is a diagram illustrating an L2P chunk recovery operation of the memory system 110 in accordance with a second embodiment.

FIG. 6 illustrates an L2P table 202, a VPB 204, an original valid page count (VPC) 3042, a reconstructed VPC 3044 and a memory device 150. The VPC may indicate how many pages store valid data for each page group. For example, the VPC may indicate how many pages store valid data for each memory block or for each super block.

In operation S602, the processor 134 may read an L2P chunk including a logical address A (LA_A). For example, the processor 134 may find the location where the L2P chunk based on the logical address A (LA_A). The L2P chunk may mapping relationship between logical addresses and physical addresses. The ECC component 146 may perform an error correction decoding operation on the L2P chunk to be read.

When the L2P chunk is a corrupted L2P chunk, the processor 134 may not find a physical address mapped to the logical address A (LA_A), and not obtain data corresponding to the logical address A (LA_A) from the memory device 150. However, even if the L2P chunk is corrupted, the processor 134 may obtain the logical addresses included in the L2P chunk based on the location where the L2P chunk is stored. For example, the L2P chunk may include the logical address A (LA_A), a logical address B (LA_B), a logical address C (LA_C) and a logical address D (LA_D), which are consecutive logical addresses. The processor 134 may recover the corrupted L2P chunk by performing operations S604, S606, S608, S610, S612 and S614.

In operation S604, the processor 134 may generate the reconstructed VPC 3044 based on normal L2P chunks of the L2P table 202. For example, the processor 134 may generate the reconstructed VPC 3044 by counting how many physical addresses among physical addresses of pages included in each memory block are included in the normal L2P chunks. In an example of FIG. 6, a count for each memory block of the reconstructed VPC 3044 is mostly omitted, and the counts for a block K (BLK_K), a block M (BLK_M) and a block N (BLK_N) are represented as "79", "95" and "43", respectively.

In operation S606, the processor 134 may generate the original VPC 3042 based on the VPB 204. For example, the processor 134 may generate the original VPC 3042 by counting how many physical addresses among the physical addresses of the pages included in each memory block are represented as valid physical addresses in the VPB 204. In the example of FIG. 6, a count for each memory block of the original VPC 3042 is mostly omitted, and the counts for the block K (BLK_K), the block M (BLK_M) and the block N (BLK_N) are represented as "80", "97" and "44", respectively.

In operation S608, the processor 134 may compare the original VPC 3042 with the reconstructed VPC 3044 and detect memory blocks that include pages indicated by physical addresses included in the corrupted L2P chunk.

As described with reference to FIG. 5, physical addresses having different bit values of the original VPB 2042 and the reconstructed VPB 2044 may be the physical addresses included in the corrupted L2P chunk. When bit values of the VPB 204 of pages included in a specific memory block are added up, a count value of the original VPC 3042 of the memory block may be derived. Thus, similarly to that described in FIG. 5, memory blocks having different count values in the original VPC 3042 and the reconstructed VPC 3044 may be memory blocks including pages indicated by the physical addresses included in the corrupted L2P chunk. In the example of FIG. 6, as a result of comparing the original VPC 3042 with the reconstructed VPC 3044, the processor 134 may determine the block K (BLK_K), the block M (BLK_M) and the block N (BLK_N), having different count values, as the memory blocks associated with the physical addresses included in the corrupted L2P chunk. That is, the processor 134 may determine that the pages indicated by the physical addresses included in the corrupted L2P chunk are included in the block K (BLK_K), the block M (BLK_M) and the block N (BLK_N).

In operation S610, the processor 134 may control the memory device 150 to perform a read operation on spare areas of pages included in the detected memory blocks. The processor 134 may sequentially read the spare areas of the detected memory blocks until the logical address A (LA_A), the logical address B (LA_B), the logical address C (LA_C) and the logical address D (LA_D) are found. The processor 134 may find physical addresses mapped to the logical address A (LA_A), the logical address B (LA_B), the logical address C (LA_C) and the logical address D (LA_D) based on a result obtained by the read operation, in the example of FIG. 6, the physical addresses mapped to the logical address A (LA_A), the logical address B (LA_B), the logical address C (LA_C) and the logical address D (LA_D) are represented as a physical address W (PA_W), a physical address X (PA_X), a physical address Y (PA_Y) and a physical address Z (PA_Z), respectively.

In operation S612, the processor 134 may recover the corrupted L2P chunk based on the logical addresses and the physical addresses obtained in operation S610. FIG. 6 illustrates the recovered L2P chunk 2022. When the L2P chunk 2022 is recovered, the processor 134 may recognize that the physical address mapped to the logical address A (LA_A) is the physical address X (PA_X).

In operation S614, the processor 134 may recover the L2P table 202 by reflecting the recovered L2P chunk 2022 in the L2P table 202.

According to embodiments of the present disclosure, the processor 134 may rapidly and accurately recover a corrupted L2P chunk even though an uncorrectable error occurs in the corrupted L2P chunk stored in the memory 144. Since the processor 134 can rapidly recover the L2P chunk and convert a logical address into a physical address, access performance of the memory system 110 may be improved.

The memory system and an operating method thereof according to embodiments of the present disclosure may rapidly recover errors of map data stored in a volatile memory.

While the present disclosure has been illustrated and described with respect to specific embodiments, it will be apparent to those skilled in the art that various changes and modifications may be made without departing from the spirit and scope of the invention as defined in the following claims. Therefore, the scope of the present invention is not limited to or by any of the above-described embodiments. Rather, the present invention encompasses all variations that fall within the scope of the claims including their equivalents.

What is claimed is:

1. A controller that controls a memory device including a plurality of pages each corresponding to a physical address, the controller comprising:
a memory suitable for storing a plurality of logical-to-physical (L2P) chunks each indicating mapping between one or more logical addresses and one or more physical addresses and an original valid page bitmap (VPB) indicating whether each of the plurality of pages is a valid page that stores valid data; and
a processor suitable for:
generating a reconstructed VPB based on normal L2P chunks when a corrupted L2P chunk is detected,
detecting pages having different states in the original VPB and the reconstructed VPB,
obtaining logical addresses mapped to physical addresses of the detected pages, respectively, and
recovering the corrupted L2P chunk based on the physical addresses of the detected pages and the obtained logical addresses.

2. The controller of claim 1,
wherein the memory includes an error correction code (ECC) component, and
wherein the processor is further suitable for detecting, as the corrupted L2P chunk, an L2P chunk including an error that is not correctable by the ECC component.

3. The controller of claim 1, wherein the processor generates the reconstructed VPB by, among the pages in the original VPB, representing a page, which is indicated by a physical address included in the normal L2P chunks, as the valid page, and representing a page, which is indicated by a physical address not included in the normal L2P chunks, as an invalid page.

4. The controller of claim 3, wherein the pages having different states in the original VPB and the reconstructed VPB are represented as valid pages in the original VPB and as invalid pages in the reconstructed VPB.

5. The controller of claim 1, wherein the processor loads the plurality of L2P chunks from the memory device when the controller is booted up, updates at least some of the L2P chunks when programming data into the memory device, and programs the updated L2P chunks into the memory device when the controller normally terminates.

6. The controller of claim 1,
wherein the processor is further suitable for reading a target L2P chunk to read data from the memory device,
wherein the processor recovers the corrupted L2P chunk when the target L2P chunk is determined to be a corrupted L2P chunk, and
wherein the processor is further suitable for reading the data from the memory device by converting a logical address of the data into a physical address based on the recovered L2P chunk.

7. The controller of claim 1,
wherein the VPB includes VPB chunks each indicating whether the plurality of pages are valid, and
wherein the processor is further suitable for:
determining, when a corrupted VPB chunk is detected, mapping between physical addresses and logical addresses of pages associated with the corrupted VPB chunk by referring to spare areas of the pages, and
recovering the corrupted VPB chunk by, among the pages associated with the VPB chunk, representing a page, which has mapping between the physical addresses and the logical addresses that coincides with mapping between the physical addresses and the logical addresses of the L2P chunks, as the valid page and representing the other pages as invalid pages.

8. A controller that controls a memory device including a plurality of pages each corresponding to a physical address, the controller comprising:
a memory suitable for storing a plurality of logical-to-physical (L2P) chunks each indicating mapping between one or more logical addresses and one or more physical addresses and an original valid page bitmap (VPB) indicating whether each of the plurality of pages is a valid page that stores valid data; and
a processor suitable for:
generating an original valid page count (VPC) for each page group based on the original VPB when a corrupted L2P chunk is detected,
generating a reconstructed VPC for each page group based on normal L2P chunks,
determining logical addresses included in the corrupted L2P chunk based on the location where the L2P chunk is stored,
detecting page groups having different states in the original VPC and the reconstructed VPC,
searching for physical addresses, mapped to logical addresses included in the corrupted L2P chunk, by referring to spare areas of the detected page groups, and
recovering the corrupted L2P chunk based on the logical addresses included in the corrupted L2P chunk and the searched physical addresses.

9. The controller of claim 8,
wherein the memory further includes an error correction code (ECC) component, and
wherein the processor is further suitable for detecting, as the corrupted L2P chunk, an L2P chunk including an error that is not correctable by the ECC component.

10. The controller of claim 8, wherein the processor generates the original VPC by counting the number of valid pages for each page group based on the original VPB.

11. The controller of claim 8, wherein the processor generates the reconstructed VPC by counting the number of pages indicated by physical addresses included in the normal L2P chunks for each page group.

12. The controller of claim 8, wherein the processor loads the plurality of L2P chunks from the memory device when the controller is booted up, updates at least some of the L2P chunks when programming data into the memory device, and programs the updated L2P chunks into the memory device when the controller normally terminates.

13. The controller of claim 8, wherein the page group is a group of pages included in one or more memory blocks of the memory device.

14. The controller of claim 8,
wherein the VPB includes VPB chunks each indicating whether the plurality of pages are valid, and
wherein the processor is further suitable for:
determining, when a corrupted VPB chunk is detected, mapping between physical addresses and logical addresses of pages associated with the corrupted VPB chunk by referring to spare areas of the pages, and
recovering the corrupted VPB chunk by, among the pages associated with the VPB chunk, representing a page, which has mapping between the physical addresses and the logical addresses that coincides with mapping between the physical addresses and the logical addresses of the L2P chunks, as the valid page and representing the other pages as invalid pages.

15. An operating method of a controller, the operating method comprising:

updating plural logical-to-physical (L2P) chunks each indicating mapping between logical and physical addresses and a valid page bitmap (VPB) representing validity of respective pages within a memory device while controlling the memory device to perform an operation;

reconstructing, upon detecting a corrupted L2P chunk, the VPB such that the reconstructed VPB represents first pages as valid and second pages as invalid among pages in the original VPB, the first pages being indicated by physical addresses within normal L2P chunks and the second pages being pages other than the first pages; and recovering the corrupted L2P chunk with physical addresses indicating inconsistent pages, which are represented as valid in the original VPB among the second pages, and logical addresses read from the inconsistent pages.

\* \* \* \* \*